(12) United States Patent
Chen et al.

(10) Patent No.: US 8,694,846 B2
(45) Date of Patent: Apr. 8, 2014

(54) METHOD FOR RECEIVING AND TRANSMITTING DATA BLOCKS

(75) Inventors: Jian Feng Chen, Beijing (CN); Ning Liao, Beijing (CN); Jun Li, Cranbury, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 340 days.

(21) Appl. No.: 12/998,281

(22) PCT Filed: Aug. 27, 2009

(86) PCT No.: PCT/EP2009/061048
§ 371 (c)(1),
(2), (4) Date: Jun. 28, 2011

(87) PCT Pub. No.: WO2010/040598
PCT Pub. Date: Apr. 15, 2010

(65) Prior Publication Data
US 2011/0264977 A1   Oct. 27, 2011

(30) Foreign Application Priority Data
Oct. 6, 2008  (EP) .................................. 083056424

(51) Int. Cl.
*H04L 1/18* (2006.01)
(52) U.S. Cl.
USPC .......................................... 714/749; 714/750

(58) Field of Classification Search
USPC .......... 370/335, 216, 442, 342, 473; 455/515; 714/748, 749, 750
See application file for complete search history.

(56) References Cited

U.S. PATENT DOCUMENTS

| | | | |
|---|---|---|---|
| 6,567,388 B1* | 5/2003 | Tomcik et al. | 370/335 |
| 7,447,148 B2* | 11/2008 | Gao et al. | 370/216 |
| 7,586,930 B2* | 9/2009 | Koski | 370/442 |
| 7,948,958 B2* | 5/2011 | Vimpari et al. | 370/342 |
| 7,995,462 B2* | 8/2011 | Gao et al. | 370/216 |
| 2003/0181214 A1* | 9/2003 | Grob et al. | 455/515 |
| 2004/0131084 A1* | 7/2004 | Bing et al. | 370/473 |
| 2006/0256740 A1 | 11/2006 | Koski | |
| 2006/0291410 A1 | 12/2006 | Herrmann | |
| 2007/0162810 A1* | 7/2007 | Sato et al. | 714/748 |
| 2008/0031179 A1 | 2/2008 | Gao et al. | |

* cited by examiner

*Primary Examiner* — David Ton
(74) *Attorney, Agent, or Firm* — Tutunjian & Bitetto, P.C.

(57) ABSTRACT

The present invention provides a scalable and reliable feedback suppression method for receiving and transmitting data block. The method comprises receiving at least one initial data packet of the data block which is sent by the transmitter to the multicast group of receivers; and sending at least one NAK packet indicating packet loss to the transmitter by at least one receiver of the multicast group, wherein the at least one NAK packet is sent in a single uplink time slot dedicated to said multicast group of receivers, and wherein the NAK packet is identical for all receivers of said multicast group.

11 Claims, 4 Drawing Sheets

Multicast CID/ Broadcast CID (16 bits) | NAK Indicator (1 bit) 0 - No Packet Loss 1 - Packet Loss

METHOD FOR RECEIVING AND TRANSMITTING DATA BLOCKS

This application claims the benefit, under 35 U.S.C. §365 of International Application PCT/EP2009/061048, filed Aug. 27, 2009, which was published in accordance with PCT Article 21(2) on Apr. 15, 2010 in English and which claims the benefit of European patent application No. 08305642.4, filed Oct. 6, 2008.

FIELD OF THE INVENTION

The present invention relates in general to communication network, and more particularly to a method for receiving and transmitting data blocks in the communication network.

BACKGROUND OF THE INVENTION

The multicast and broadcast service (MBS) is a promising technology to simultaneously transmit the same data content to a plurality of client devices. For example, in a wireless communication system, the wireless terminal devices are often designed and configured to receive video, audio, and multimedia content simultaneously. Therefore, the transmitter of the wireless base station will multicast or broadcast the video, audio and multimedia content to these wireless terminal devices so that each of the devices receives and presents the video and/or audio content to its user.

In addition, data packet loss or error can be unavoidable and unpredictable in the communication network, especially in a wireless communication network. In order to improve the quality of the received contents, a loss recovery technology such as Forward Error Correction (FEC) and Automatic Repeat reQuest (ARQ) can be deployed in a bi-directional communication network. The receivers are required to send back an acknowledgement reporting whether data packets have been successfully received or not. The transmitter monitors the acknowledgement (ACK), representing packets that are properly received, or negative-acknowledgment (NAK), indicating packet loss has happened. Upon reception of the feedback, the transmitter can determine whether to send out additional parity packets or re-transmit packets.

To limit the number of feedback packets from all receivers in the multicasting system, NAK instead of ACK is used to feed back to the sender because of its lighter overhead requirement. However, for a multicast or broadcast service, the transmitter may send the same data packets to dozens or hundreds of receivers and since the report of NAK packets is also not predictable, data congestion can still occur in a reverse uplink channel.

US2008/0031179 discloses a method to assign a feedback time slot to all receivers with a predetermined number of packet losses in time division multiplexing accessing mode. For example, receivers having experienced one packet loss will send feedback in the first time slot, receivers sending feedback in the second time slot will have experienced two packets losses. The required feedback bandwidth depends on the number of packet losses. The drawback of this method is that the transmitter should allocate an estimated number of time-slots (equal to the maximum number of packet losses) for the feedback transmission.

Therefore, an improved method for receiving and transmitting data contents is needed.

SUMMARY OF THE INVENTION

The invention concerns a method for receiving a data block from a transmitter, used in a receiver part of a multicast group of receivers in a communication network, including: receiving at least one initial data packet of the data block which is sent by the transmitter to said multicast group; and sending at least one NAK packet to the transmitter by said receiver if existing packet loss, wherein the at least one NAK packet is sent in a single uplink time slot dedicated to said multicast group of receivers, and wherein the NAK packet is identical for all receivers of said multicast group; further receiving at least one additional packet of the data block, which is sent by the transmitter based on NAK packet from at least one receiver of said multicast group.

The invention also concerns receiver for implementing the method for receiving a data block as mentioned above. The receiver includes means for receiving at least one initial data packet of the data block which is sent by the transmitter to said multicast group; and means for sending at least one NAK packet indicating packet loss to the transmitter by said receiver, wherein the at least one NAK packet is sent in a single uplink time slot dedicated to said multicast group of receivers, and wherein the NAK packet is identical for all receivers of said multicast group.

The invention also concerns a method for sending a data block to a multicast group of receivers, used in a transmitter of a communication network, including: sending at least one data packet of the data block; and sending at least one recovery data packet for the data block, when at least one NAK packet is received in a single uplink time slot from the multicast group of receivers, wherein the NAK messages sent by the plurality of receivers are identical.

The invention also concerns a transmitter for implementing the method for transmitting a data block as mentioned above. The transmitter includes means for sending at least one data packet of the data block; and means sending at least one recovery data packet for the data block, when at least one NAK packet is received in a single uplink time slot from the multicast group of receivers, wherein the NAK messages sent by the multicast group of receivers are identical.

BRIEF DESCRIPTION OF DRAWINGS

These and other aspects, features and advantages of the present invention will become apparent from the following description in connection with the accompanying drawings, among which.

DETAIL DESCRIPTION OF PREFERRED EMBODIMENTS

A description will now be given with reference to attached figures to illustrate many advantages/features of the present invention, according to an illustrative embodiment.

Figure 1:
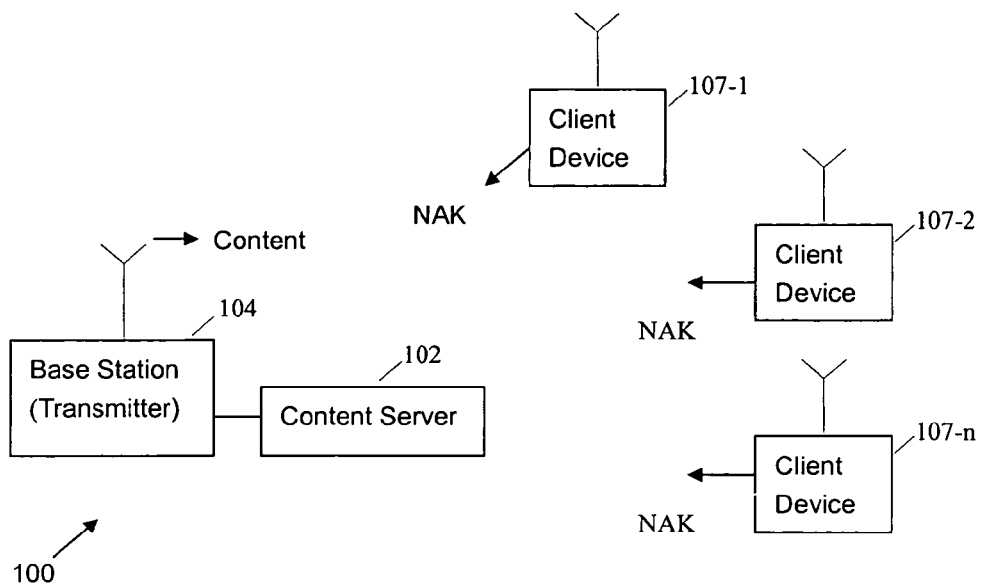
FIG. 1 is a schematic diagram showing a wireless network implementing Time Division Multiplex (TDM) scheme used to explain an embodiment of the invention.

FIG. 1 is a schematic diagram showing a wireless network implementing a Time Division Multiplex (TDM) scheme used to explain an embodiment of the invention. As shown in FIG. 1, the wireless communication network 100 includes content server 102 having content data for multicast or broadcast to a multicast group 107. The content data may be for example a video stream, a video file, an audio file or other data and any combination thereof. Base station 104 obtains the content from content server 102. Base station 104 arranges the content data into a series of data blocks and encodes those data blocks according to a rateless code such as fountain code, Luby Transform code, process or fixed rate code such as Reed-Solomon code process and so on. Each of the data blocks is then sequentially transmitted, in multicast or broadcast mode, to mobile client (receiver) devices 107-1 to 107-n of a multicast group.

For each data block, the transmitter of base station 104 transmits an initial set of transmission data packets of the data block to all receivers of the client devices 107-1 to 107-n. The initial data packets are actual content data to be transmitted. Upon receiving the data packets, each receiver determines if it has received sufficient transmission packets or symbols to decode the data block. If it has not received sufficient packets or symbols, the receiver responds with a NAK message to base station 104, so that the transmitter transmits additional recovery data packets, such as parity data packets or FEC packets and so on, to the receivers. According to the embodiment of the invention, if a sufficient number or all packets are successfully received, there is no need to send any response by the receivers.

In the present embodiment of the invention, a TDM scheme is employed which divides the available bandwidth in each frame into time slots and allocates these time slots by downlink time slot channel and uplink time slot channel. The content data is transmitted by downlink time slot to the receivers of the client devices, and the NAK is transmitted by uplink time slot to the transmitter.

Figure 2:
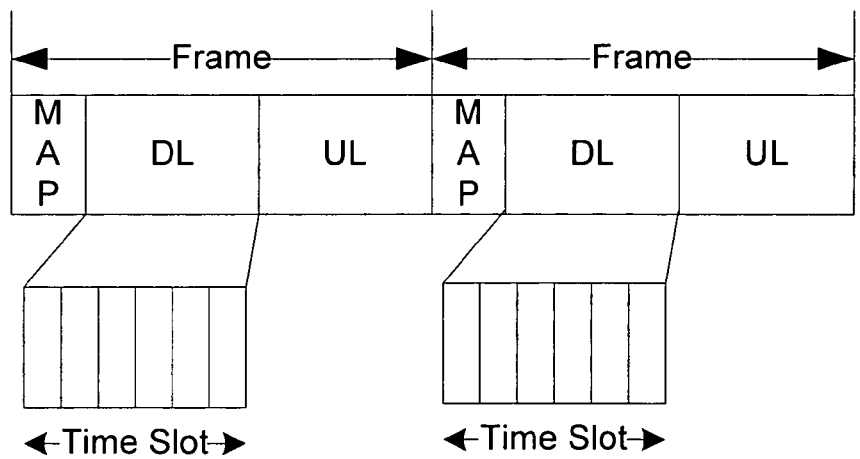
FIG. 2 is a diagram showing a TDM allocation scheme according to the embodiment of the invention.

FIG. 2 is a diagram showing a TDM allocation scheme according to the embodiment of the invention. As shown in FIG. 2, the available bandwidth in each frame has been divided into time slots, and these time slots are allocated to a downlink time slot channel (DL in FIG. 2) and an uplink time slot channel (UL in FIG. 2). It is known to one skilled in the art that the bandwidth allocated for a downlink channel or an uplink channel is not required to be equal or fixed, and that the downlink bandwidth or uplink bandwidth can be allocated in the base station based on traffic loads. In addition, the specific allocation result is multicast or broadcasted in the 'MAP' field at the beginning of each frame, so that each receiver is aware of the time slot allocated for it to receive or transmit data.

In the present embodiment, all receivers in a same multicast group are allocated a same uplink time slot to transmit NAK packets, so only one uplink time slot is allocated. In order to report NAK messages of multiple receivers simultaneously using one time slot, the format of feedback message will be defined as an identical one. In synchronization wireless network, the identical signal from multiple nodes, such as multiple receivers, will be regarded as multi-path fading, and the base station can parse the multiple NAK messages successfully. Therefore, the embodiment of the invention can be used in any of such synchronization wireless network, such as UMTS, HSUPA, TD-SCDMA, IEEE802.16, LTE or similar networks.

Figures 3, 4:
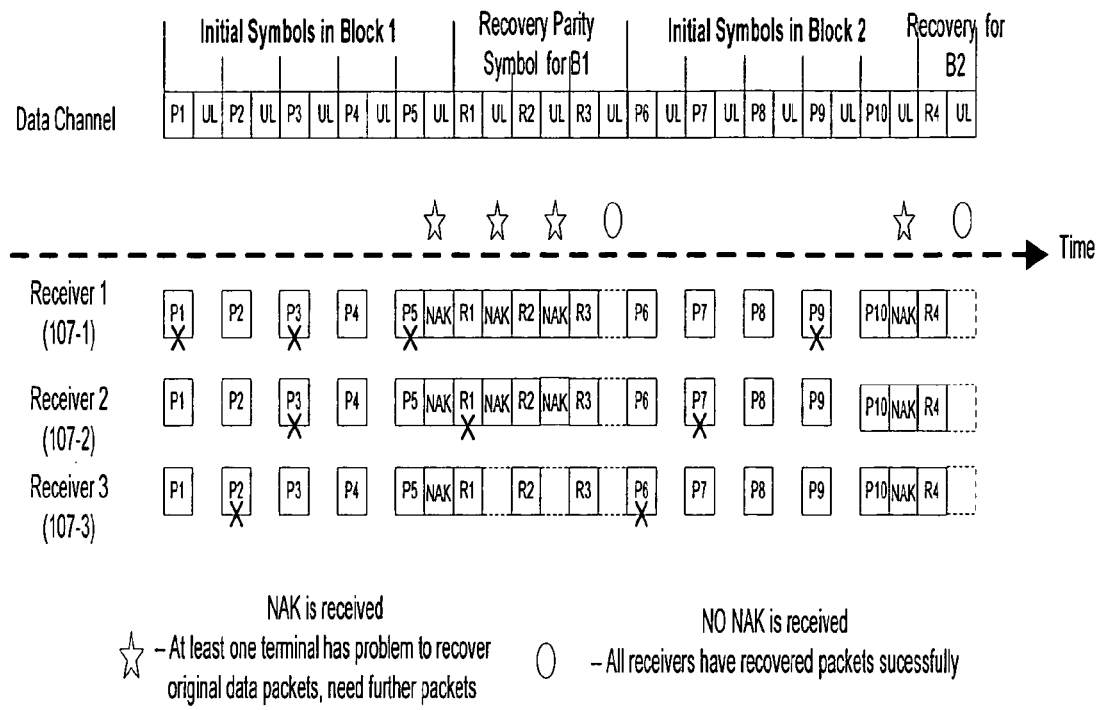
FIG. 3 is a diagram showing a NAK message format according to the embodiment of the invention.
FIG. 4 is a diagram showing a time slot allocation for NAK suppression according to the embodiment of the invention.

FIG. 3 is a diagram showing a NAK message format according to the present embodiment. As shown in FIG. 3, the NAK message includes two fields, one being the multicast CID (customer identity) or broadcast CID, and the other being a NAK indicator: a value of '0' in this field means there is no packet loss, and a value of '1' means there is packet loss. For the multiple receivers of a multicast group, the CID field will be the same, that is, the CID of the multicast group. In addition, according to the embodiment, all receivers having packet loss will send back a NAK message to the transmitter. For those receivers having no packet loss, the feedback is not needed. Therefore, the same NAK message will be sent back to the transmitter. In addition, it is known to one skilled in the art that other identical message formats can be used based on the embodiment.

FIG. 4 is a diagram showing a time slot allocation for NAK suppression according to the embodiment of the invention. In the sender side, the initial packets or symbols in block 1 (packet 1 to packet 5) are firstly transmitted. During the block transmission, there is no need to report acknowledgement from receivers. When the packet 5 is delivered, an uplink time slot will be assigned to all receivers that belong to this multicast session to report the reception status. If there is any packet loss during the initial symbols transmission in the data block, for example, receiver 107-1 has loss for P1/P3/P5, receiver 107-2 has loss for P3 and receiver 107-3 has loss for P2, a NAK message will be sent by the receivers. In this example, all receivers of the multicast group have packet loss for block 1, so each one will report NAK simultaneously in the first uplink feedback time slot, by using an identical message format as defined in FIG. 3. Upon receiving the NAK, the transmitter will realize there is at least one terminal device in the multicast group having a problem decoding the original data packets, so it will send an additional recovery packet or symbol R1 in the downlink time slot of next frame, then allocate another uplink feedback slot in the same frame as R1. The additional recovery packet can be at least one data packet or a group of packets.

The iteration of the above mentioned feedback procedure will be done until all receivers capture enough symbols to recover the original data packets and no NAK is detected in the uplink channel. As shown in FIG. 4, the symbol "☆" indicates NAK is received from the receivers, and at least one receiver needs additional recovery packets, and the symbol "○" indicates no NAK is received, and all receivers could recover the initial packets successfully. According to the embodiment, the NAK feedback message indicates packet loss whether it is caused by the initial symbols or by the recovery symbols (such as P3 or R1 in receiver 2). When no NAK is detected in uplink channel for block 1, the transmission for data of block 1 is over and the procedure for the next data block is started.

For example, the following block 2 has a better reception status since each receiver only has one packet loss, so that less feedback time is required. The different number of the required feedback report time slots in this sample illustrates the scalability of the proposed mechanism for feedback compression. The required time slot for feedback report only depends on the maximum number of loss packets in the data block, which has no relation with the receiver number. On the other hand, the feedback report timeslot is not a fixed value, it will be variable based on the reception condition among receivers. In bad reception condition with dense packet loss (e.g. data block 1), the recovery symbols will be delivered multiple times, while in good reception condition (e.g. data block 2) with sparse packet loss, only a small number of recovery data packets is required.

Alternatively, in order to reduce delay of symbol transmission because of the insertion of recovery symbols, one method is to adjust the number of the first recovery packets dynamically based on the statistics of the feedback report during a given time interval. For example, based on the statistics, an average number of recovery packets used in several data blocks is 5. Then during a time period under the same situation, the first recovery packets in the downlink time slot will include 5 additional recovery packets that will be sent to the receivers of the multicast group.

Another method is to set a predetermined condition to terminate the feedback procedure. For example, the predetermined condition can be the maximum number of recovery symbols for a given block or the maximum allowable time period of transmitting the recovery symbols for a given block. If the set threshold value is reached, the feedback procedure of sending NAK data packets will be terminated and the transmitter will multicast or broadcast the next data block.

Figure 5:
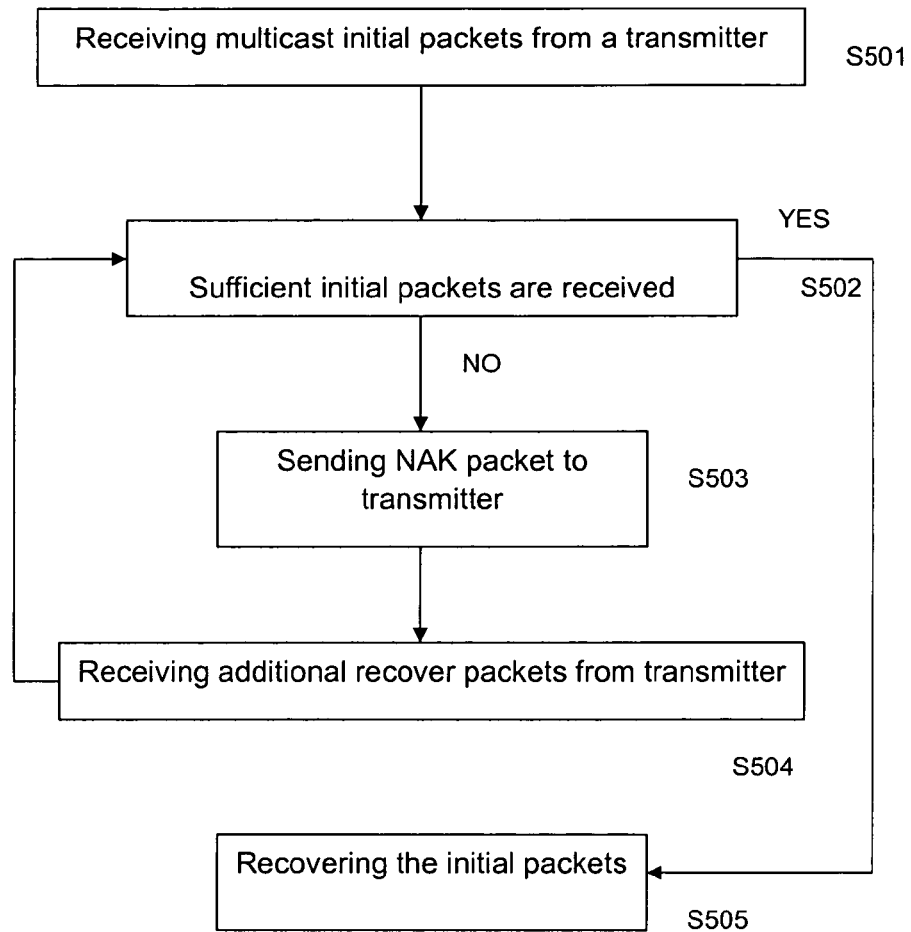
FIG. 5 is a flow chart showing a method for receiving a data block from a transmitter according to the embodiment of the invention.

FIG. 5 is a flow chart showing a method for receiving a data block from a transmitter according to the embodiment of the invention. As mentioned above, the receiving method is used by a plurality of receivers of a multicast group in a synchronization communication network. The description below will address the case of a single receiver—of course, the other receivers will do the same. At step 501, a receiver receives multicast (or, according to a variant, broadcast) initial packets from a transmitter of the system, wherein the initial packets can be one or more data packets. Then, at step 502, the receiver determines whether sufficient initial packets have been received by each of the receivers. If that is not the case, at least one NAK packet is sent by the receiver to the transmitter at step 503. The at least one NAK packet is send in one uplink time slot, and has the same message format as the one used by the other receivers. At step 504, the additional recovery packet or packets will be received from the transmitter. After receiving the additional packets, the receiver will determine if there is still packet loss (step 502), and the step 503 will also be performed repeatedly. Then at step 505, recovering the initial packets is performed by the receivers. Alternatively, if the predetermined condition is reached as mentioned above, the receivers will terminate the step 503, and perform step 505 directly by the received initial data packets and the additional packets of the data block.

Figure 6:
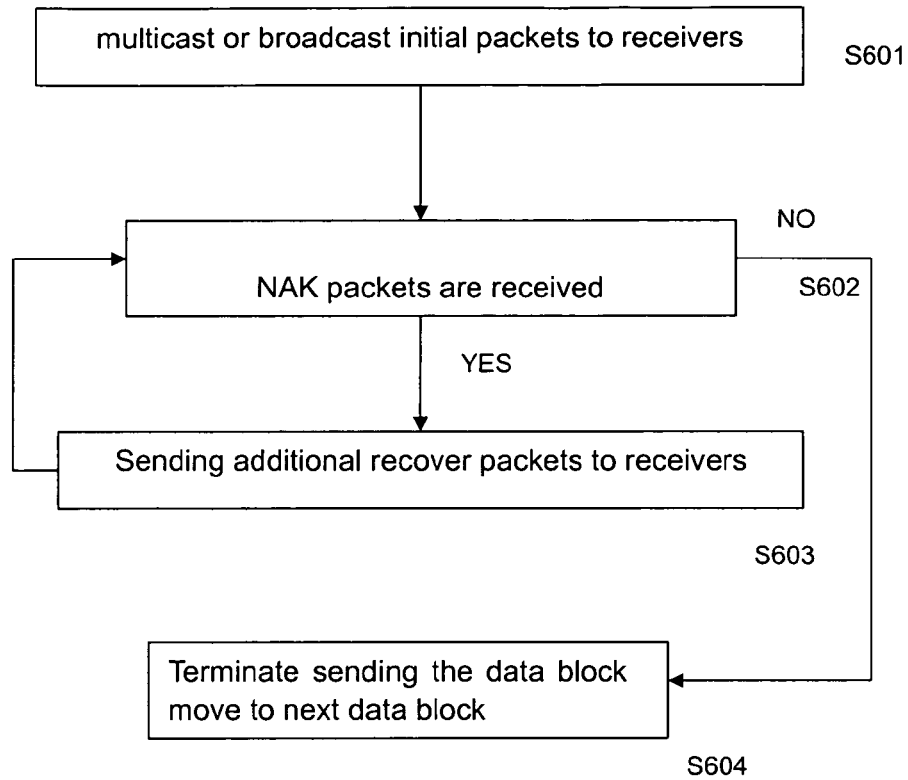
FIG. 6 is a flow chart showing a method for multicasting or broadcasting a data block to a plurality of receivers according to the embodiment of the invention.

FIG. 6 is a flow chart showing a method for multicasting or broadcasting a data block to a plurality of receivers according to the embodiment of the invention. At step 601, the transmitter multicasts or broadcasts at least one initial data packet of the data block. The number of the initial data packets is based on the corresponding coding scheme of the data block. In addition, an uplink time slot for NAK feedback will be allocated to the plurality of receivers of the multicast group simultaneously in the MAP field of the frame. Then the transmitter determines whether at least one NAK feedback packets is received during the allocated uplink time slot at step 602. The at least one NAK has the same message format for all receivers, and as such can be considered as one message. No congestion will be caused. Then at step 603, at least one additional recovery data packet will be multicast or broadcasted by the transmitter when the NAK packet is received. If no NAK packet is received or a predetermined condition occurs, the transmitter will terminate sending packets of the data block and move to next data block at step 504.

Although a synchronization network is used to explain the present embodiment, one skilled in the art knows that the method of sending and receiving data blocks of the embodiment can be used only if the single time slot allocated to a group of receivers is a time slot of a synchronization uplink channel despite the network is synchronized or not. In addition, although the data block in the embodiment is recited to be sent by multicast mode or broadcast mode, one skilled in the art knows that the method can be used only if a single time slot is allocated to a group of receivers, and despite the style of sending the data block.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method for receiving a data block comprising at least one data packet from a transmitter, used in a receiver part of a multicast group of receivers in a communication network, including:
    a. receiving said at least one data packet of the data block;
    b. if insufficient data packets have been received in order to decode said data block due to packet loss, sending a negative-acknowledgment (NAK) message during a same time slot allocated to all receivers of the multicast group and wherein said NAK message is identical for all receivers of the multicast group;
    c. receiving at least one recovery data packet from said transmitter; and
    d. repeating steps b and c until a predetermined condition is met.

2. The method according to claim 1, wherein the same time slot is a time slot of a synchronization uplink channel.

3. The method according to claim 1, further including the step of sending is performed if there is still packet loss so as to have a problem of decoding the data block at the at least the receiver after receiving the at least one recovery data packet.

4. The method according to claim 3, wherein data packets taken into consideration for sending a NAK message include said at least one data packet and at least one recovery data packet.

5. The method according to claim 1, wherein the predetermined condition is the maximum number of recovery symbols for a given data block or the maximum allowable time period of transmitting the recovery symbols for a given block.

6. A receiver for implementing the method for receiving a data block according to claim 1.

7. A method for sending a data block comprising at least one data packet to a multicast group of receivers, used in a transmitter of a communication network, including:
    a. sending said at least one data packet of the data block;
    b. providing a same time slot for all receivers of the multicast group to send a NAK message, wherein the NAK message is the same for all receivers from the multicast group;
    c. if a NAK message is received:
    d. sending at least one recovery data packet to the receivers of the muitcast group;
    e. providing a further same time slot for receivers of the multicast group to send a further NAK message; and
    f. repeating steps c to e until a predetermined condition is met.

8. The method according to claim 7, wherein the uplink time slot is a time slot of a synchronization uplink channel.

9. The method according to claim 7, wherein the further NAK message indicates packet loss of said at least one data packets or said at least one recovery packets.

10. The method according to claim 7, wherein the predetermined condition is a number of the further sending steps.

11. A transmitter for implementing the method for transmitting a data block according to claim 7.

* * * * *